United States Patent [19]

Perrin

[11] Patent Number: 5,863,368
[45] Date of Patent: Jan. 26, 1999

[54] PROCESS AND DEVICE FOR APPLYING A THREAD ONTO A SUPPORT

[75] Inventor: Frédéric Perrin, Clermont-Ferrand, France

[73] Assignee: Compagnie Generale des Etablissements Michelin—Michelin & Cie, Clermont-Ferrand Cedex, France

[21] Appl. No.: 594,251

[22] Filed: Jan. 30, 1996

[30] Foreign Application Priority Data

Feb. 1, 1995 [FR] France .................................. 95 01251

[51] Int. Cl.⁶ .................................................. B29D 30/38
[52] U.S. Cl. ...................... 156/177; 156/117; 156/178; 156/440
[58] Field of Search ..................... 156/397, 440, 156/439, 441, 117, 177, 178, 179, 181

[56] References Cited

U.S. PATENT DOCUMENTS

| | | | |
|---|---|---|---|
| 3,010,865 | 11/1961 | Porter | 156/181 |
| 3,053,717 | 9/1962 | Bright | 156/177 |
| 3,082,140 | 3/1963 | Vanzo . | |
| 3,511,739 | 5/1970 | Hebberling . | |
| 4,405,395 | 9/1983 | Wright | 156/117 |
| 4,409,059 | 10/1983 | Holroyd et al. | 156/117 |
| 4,820,143 | 4/1989 | Eroskey et al. | 156/440 |
| 4,981,542 | 1/1991 | Carrier . | |
| 5,002,621 | 3/1991 | Ikeda . | |
| 5,242,520 | 9/1993 | Carrier . | |
| 5,393,364 | 2/1995 | Millier | 156/117 |

FOREIGN PATENT DOCUMENTS 40360   12/1909   Germany ................................ 156/440

*Primary Examiner*—Geoffrey L. Knable
*Attorney, Agent, or Firm*—Baker & Botts, L.L.P.

[57] ABSTRACT

Process and device (1) for applying a thread (3) onto a support (9) while imparting to the thread (3) a sinuous shape, which are characterized by the following features:

a) the thread (3) is delivered with a controlled linear speed of value $V_1$;

b) the thread (3) is displaced transversely to its direction of advance;

c) it is applied onto the support (9), the thread (3) and the support (9) at the contact being driven with a linear speed $V_2$ which is less than $V_1$;

d) the conformation ratio of the thread (3) is thus defined by the ratio $V_1/V_2$.

Plies obtained by the process and device (1) of the invention.

Articles, in particular tires, made using such plies.

10 Claims, 6 Drawing Sheets

PROCESS AND DEVICE FOR APPLYING A THREAD ONTO A SUPPORT

BACKGROUND OF THE INVENTION

The present invention relates to a process and device which make it possible to apply threads onto a support, particularly a support of plastic material or rubber, this process and device permitting, for instance, the production of reinforcement plies, in particular reinforcement plies for tires. The invention relates, in particular, to a process and device which permits the application of threads onto a support while imparting a sinuous shape to them.

Devices which permit the application of threads onto a support while imparting a sinuous shape to them are described, for instance, in the following patents or patent applications:

FR-A-2 042 859, FR-A-2 325 497, U.S. Pat. No. 1,800, 179, U.S. Pat. No. 5,002,621, U.S. Pat. No. 4,820,143.

These devices have at least one of the following drawbacks:

complexity, giving rise to frequent failures, or requiring costly and frequent maintenance;

lack of precision in the laying of the threads, so that the plies obtained have a heterogenous geometry and therefore have physical properties which vary along their length;

slow speed.

U.S. Pat. No. 4,981,542 describes a device employing two clamps for applying yarns onto a support. This device makes it possible to deposit the threads with great precision, but the speed of deposition is relatively slow as a result of the complicated succession of movements of the clamps which require the stopping of the support upon the transverse movements of the threads before they are applied onto the support and upon the application of the threads onto the support.

U.S. Pat. No. 5,242,520 describes a device for applying threads on a support by means of a drum having fixed teeth and movable teeth, and U.S. Pat. No. 5,393,364 describes a device for applying threads on a support by feeding the threads with a controlled speed onto a drum, the sinuous form being obtained by means of teeth which are displaced with respect to the other teeth parallel to the axis of rotation, at least some of said teeth being flexible between a free end in contact with a thread and an anchoring zone. These devices make it possible to deposit the threads with great precision and with substantial speed, but they are relatively complicated and costly.

SUMMARY OF THE INVENTION

The object of the invention is to overcome these drawbacks or to attenuate them to a large extent.

Therefore, the process in accordance with the invention for applying at least one thread onto at least one support so as to obtain at least one ply, while imparting the thread a sinuous shape, is characterized by the following features:

a) the thread is delivered with a controlled linear speed of value $V_1$;

b) the thread is displaced transversely to its direction of advance;

c) it is applied onto the support, the thread having the sinuous shape as a result of the transverse displacement, the thread and the support thus in contact being driven in such a manner that the linear speed of the support has a value $V_2$ which is less than $V_1$;

d) the conformation ratio of the thread thus applied onto the support is thus defined by the ratio $V_1/V_2$.

The invention also concerns a device for applying at least one thread onto at least one support so as to obtain at least one ply, while imparting the thread a sinuous shape, such device being characterized by the following features:

a) it has means making it possible to deliver the thread with a controlled linear speed of the value $V_1$;

b) it has means permitting the displacement of the thread transversely to its direction of advance;

c) it has means making it possible to apply the thread onto the support, the thread having the sinuous shape due to the means which permit displacing it transversely, as well as means making it possible to drive the thread and the support thus in contact in such a manner that the linear speed of the support has a value $V_2$ which is less than $V_1$;

d) the conformation ratio of the thread thus applied onto the support is thus defined by the ratio $V_1/V_2$.

The invention also concerns the plies obtained by the process and device of the invention, these plies being in particular reinforcement plies.

The invention also relates to articles comprising such reinforcement plies, these articles being, for instance, tubes, and manufactured articles of rubber, in particular tires.

The term "thread" is used herein in a very general sense. A thread may be a "single thread" formed, for instance, of one or more filaments. When the single thread is formed of a single filament, it is called a "monofilament", and when the single thread is formed of several filaments, it is called a "multifilament". A thread may furthermore itself be an assembly of single threads. By way of example, such an assembly is called a "twist" when it is formed of single threads united by a single twisting operation, and such an assembly is referred to as a "cable" when it is formed of several threads, at least one of which is a twist, which are combined by one or more twisting operations.

The expression "sinuous shape" is very general and is applied, for instance, to the case that the threads have an undulated shape, in particular a practically sinusoidal shape, and to the case that the threads have practically rectilinear segments connected by curved portions.

The threads are preferably textile threads, for instance threads of aromatic or non-aromatic polyamides, rayon or polyester threads, or threads formed of different materials and of varying diameter, preferably between 0.2 and 4 mm, but the invention also applies to non-textile threads, for instance metallic wires, in particular wires of steel, carbon wires or wires of glass or boron fibers, and, in general, threads the diameter of which may be less than 0.2 mm or more than 4 mm.

DESCRIPTION OF THE DRAWINGS

The invention will be illustrated by the non-limitative examples which follow, with reference applicable to the drawing, in which.

DESCRIPTION OF PREFERRED EMBODIMENTS

Figure 1:
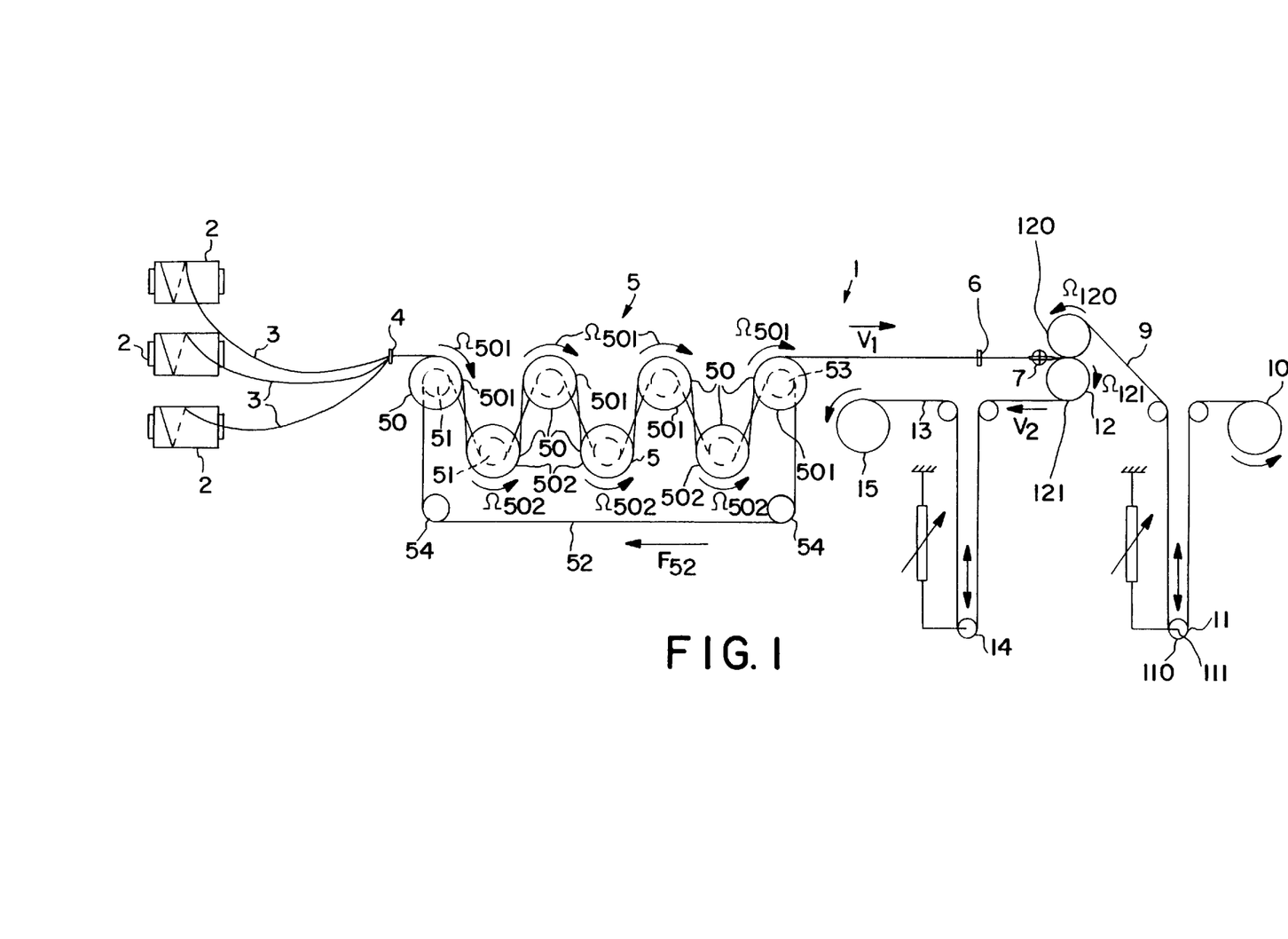
FIG. 1 shows, in profile view, a device in accordance with the invention.
Figure 2:
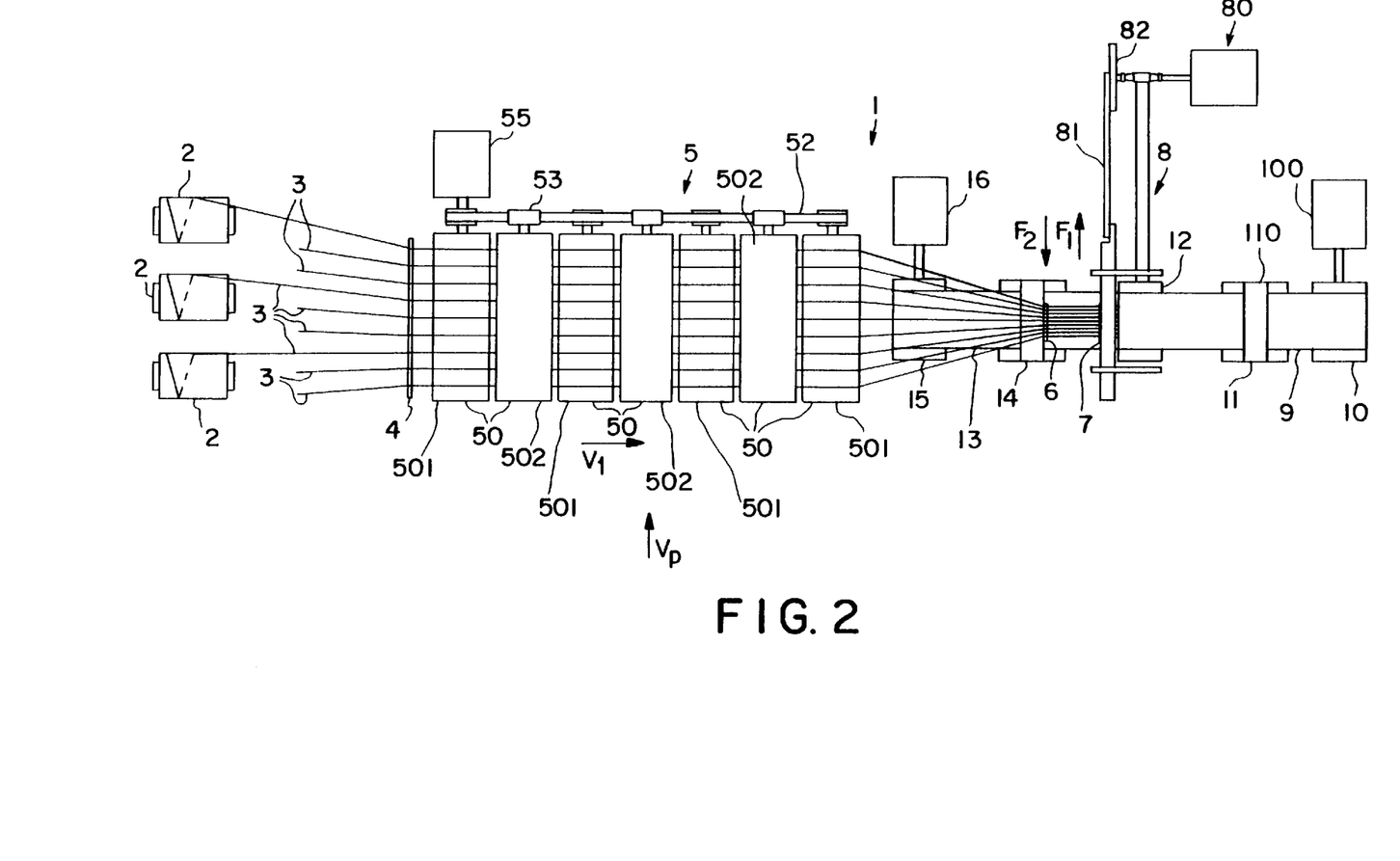
FIG. 2 shows, in top view, the device shown in FIG. 1.

The device according to the invention shown in FIGS. 1 and 2 comprises several reels 2 on each of which a thread 3 is wound. For clarity of the drawing, only three reels 2 are shown in FIGS. 1 and 2. The threads 3, driven by the capstan 5, pass into brake means 4 which impart to the said threads 3, upon emergence from the system 4, a slight tension before their arrival at the capstan 5.

Figure 3:
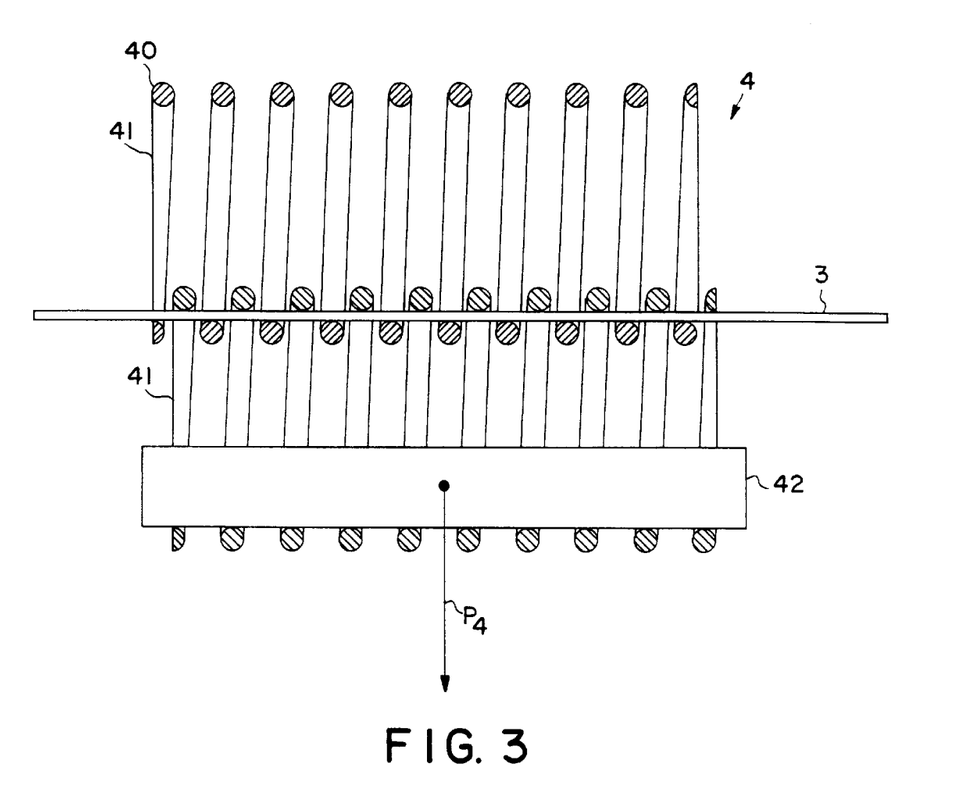
FIG. 3 shows, in greater detail and in section, a brake system used in the device shown in FIGS. 1 and 2.

The brake means 4, shown partially in greater detail in FIG. 3, comprise, for instance, as many pairs 40 of interleaved springs 41 as there are threads 3, each thread passing into one of these pairs 40. The force applied to the thread 3 by the corresponding pair 40 varies as a function of the weight $P_4$ of the cylinder 42 which is in contact with one of the springs 41 and pulls it downward.

The threads 3 are driven without slippage by the capstan 5, which imparts to them a given linear speed (the same for all the threads) indicated in FIGS. 1 and 2 by the vector $V_1$, directed in longitudinal direction, for instance horizontally. FIG. 1 is a profile view of the device 1 taken along the arrow $V_p$ in FIG. 2; FIG. 2 is a top view of the device 1; and FIG. 3 is a section through the brake means 4 in a vertical plane passing through a thread 3.

The capstan 5 is formed of seven rollers 50 with horizontal parallel axes 51, these axes 51 being offset with respect to each other in the direction of advance of the threads 3 which is diagrammatically indicated by the horizontal arrow $V_1$ in FIG. 1. The rollers 50, of the same diameter, are driven in rotation by the belt 52 which winds around the hubs 53 of the rollers 50 and around rollers 54, in the direction of the arrow $F_{52}$. The rollers 50 comprise four rollers 501 the axes 51 of which are arranged substantially in a horizontal plane and three rollers 502 the axes 51 of which are substantially arranged on another horizontal plane located below the preceding plane. Under the action of the belt 52, the rollers 501 turn with the same angular speed, diagrammatically indicated by the arrows $\Omega_{501}$ and the three rollers 502 turn with the same angular speed, diagrammatically indicated by the arrows $\Omega_{502}$, the arrows $\Omega_{501}$ and $\Omega_{502}$ being opposite each other as shown in FIG. 1 and having the same absolute value. In a known manner, a motor 55 drives one of the rollers 50 and the other rollers are driven through the belt 52.

At the outlet from the capstan 5, the length of each thread 3 delivered is therefore constant, equal per second to the linear speed $V_1$, that is to say the absolute value of the vector $V_1$.

The threads 3 delivered by the capstan 5 arrive at the means 6 which permit bringing the threads 3 together so as to arrange them substantially in a horizontal plane in which they are substantially parallel to each other. These means 6 are not absolutely necessary, but they facilitate the further working of the threads 3 and they comprise, for example, a stationary comb through which the threads 3 pass.

The threads 3 then pass into means 7 which make it possible to impart to the threads 3 transverse alternating movements diagrammatically indicated in FIG. 2 by the opposite arrows $F_1$ and $F_2$ perpendicular to the general direction of advance of the threads 3, diagrammatically indicated by the arrow $V_1$ in FIGS. 1 and 2. These means 7 are, for instance, a thread guide the transverse movements of which, indicated diagrammatically by the arrows $F_1$ and $F_2$, are obtained due to the system 8 which comprises a motor 80 driving a connecting rod 81 which is fastened on a flywheel 82.

The support 9, for instance a film of plastic material on which a layer of rubber is applied, is initially wound on the reel 10. It is driven by the calender 12, passing into the system 11 which makes it possible to regulate its tension. This system 11, which is known, comprises, for instance, a horizontal roller 110. The vertical position of the axis 111 of the roller 110 makes it possible to regulate the speed of the motor 100 which causes the unwinding of the support 9 from the reel 10, and the tension of the support 9 is established by the weight of the roller 110.

The support 9 thus arrives at the calender 12 with constant tension, and as a result of the action of the thread guide 7, the threads 3 are applied against the rubber of the support 9 with an undulated shape, upon entrance into the calender 12, the final contact of the threads 3 and the support 9 being obtained by the pressing due to the drums 120 and 121 of the calender 12. The drums 120, 121, whose cylindrical outer surface is smooth, have the same diameter and turn with the opposite angular speeds represented by the arrows $\Omega_{120}$, $\Omega_{121}$ respectively, with the same absolute value (FIG. 1). The calender 12 thus drives the support 9 and the threads 3 at the contact at a constant longitudinal speed represented by the vector $V_2$ in FIG. 1, the linear speed $V_2$, which is the absolute value of the vector $V_2$, being less than the linear speed $V_1$.

The device 1 is devoid of means for adjusting the tension between the capstan 5 and the calender 12.

The means 7 are adjusted in such a manner that each thread 3 is tensioned between the capstan 5 and the point where such thread arrives in contact with the support 9 in the calender 12 and this at the time when the means 7 reach their extreme transverse position, in accordance with the arrow $F_1$ and in accordance with the arrow $F_2$, that is to say when the thread 3 forms the maximum angle with the longitudinal direction. On the other hand, when the means 7 are in a position intermediate between these extremes, each of the threads 3 can assume a slack position between the means 7 and the calender, no longer being tensioned since the linear speed $V_2$ of drive by the calender 12 is less than the linear speed $V_1$ with which this thread 3 is delivered by the capstan 5. This relaxation is most accentuated in the vicinity of the middle position of the means 7 when they are practically between the extreme positions previously described. There thus takes place an automatic balancing of the arrival of the threads 3 on the support 9, in such a manner that the length of each thread 3 deposited on the support 9 during a time T corresponding to the length of a wave of the undulation of the thread 3 is equal to $V_1 T$ and therefore constant when $V_1$, as well as the frequency of the alternating movements of the means 7, are set to fixed values, T corresponding to the time during which these means 7 perform a complete alternating movement. The speed $V_2$ is also set to a fixed value during the production of the ply 13.

This said adjustment of the means 7 is effected in particular by regulating the distance between the means 7 and the calender 12 by known means, not shown in the drawing for purposes of simplification, for instance adjustment screws.

The amplitude of the oscillations of the means 7 along the arrows $F_1$ and $F_2$ can be controlled in simple manner, for instance by varying the position of the connecting rod 81 on the flywheel 82.

The ply 13, formed of the support 9 and of the threads 3 in contact with the support 9, passes around the tension regulating system 14 and is then wound onto the reel 15 which is driven in rotation by the motor 16. The system 14 is, for instance, similar to the system 11 described previously, and it preferably imparts the support 9 the same tension as the system 11.

Figure 4:
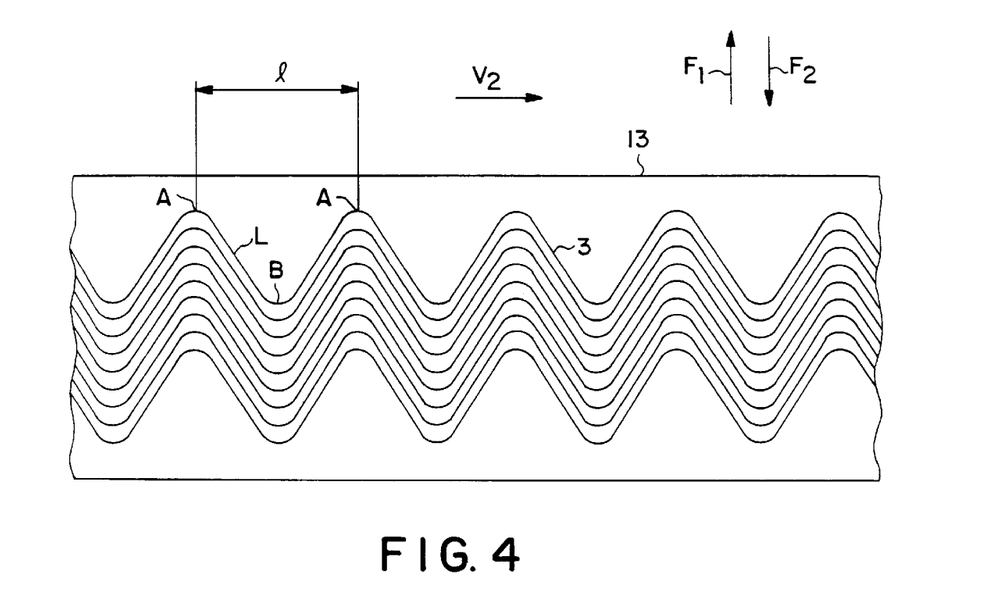
FIG. 4 shows a top view of a ply in accordance with the invention, obtained with the device in accordance with the invention.

FIG. 4 shows, seen from above, a portion of the ply 13 thus obtained upon emergence from the calender 12. For a given thread 3, "1" represents the undulation length of one undulation of a thread 3, that is to say the rectilinear length between two successive crests A of this undulation which are located on the same side of the ply 13, in the direction on the left with respect to the arrow $V_2$, and "L" represents the actual length of the undulated thread 3 between these successive points A, that is to say for one undulation length. By definition, the conformation ratio $\tau$ of the thread 3 is given by the relationship $\tau = L/1$. This ratio $\tau$ is equal to the ratio R given by the relationship $R = V_1/V_2$, that is to say it is given by the ratio of the linear speeds $V_1$ (linear speed of the threads 3 upon emergence from the capstan 5) and $V_2$ (linear speed of the support 9 as a result of the action of the calender 12).

The period of the undulation of the threads 3 on the ply 13, that is to say, for a given thread 3, the number of undulations for a given length of ply 13, is defined by adjusting the ratio between the frequency of the alternating displacements of the thread guide 7 and the speed of rotation of the rollers of the calender.

FIG. 4 shows a crest point B located between two successive points A, this point B being located to the right of the first point A in the direction of the arrow $V_2$, this point B therefore corresponding to a half undulation length. It should be noted that there is a certain delay between the oscillation of the means 7 and the position of any thread 3 on the support 9, that is to say that, in FIG. 4, each point A corresponds practically to an extreme position of the means 7 in accordance with the arrow $F_2$ (directed towards the right) and each point B corresponds practically to an extreme position of the means 7 along the arrow $F_1$ (directed towards the left).

In the example described, the film of plastic material assures the holding of the support 9 and avoids elongation of the rubber of this support upon the production of the ply 13.

The device 1 of the invention permits the following advantages:

it can be devoid of means which make it possible to regulate the tension of the threads 3 between the capstan 5 and the calender 12; this preferred embodiment, in accordance with the example described, permitting simple production, since an adjustment of the tension between the capstan 5 and the calender 12 would require a complex dependence between the tension regulating means and the position of the means 7 in order for the tension to be controlled in accordance with the undulation of the threads 3 on the support 9; in the invention, on the other hand, the interdependence between the speed $V_1$ and the speed $V_2$ is easy to obtain;

the conformation ratio of the threads 3 is regulated in a direct, simple and precise manner by the adjustment of the speeds of the capstan 5 and the calender 12, and the amplitude of the alternating transverse movements of the thread guide 7 does not have to be regulated precisely since any variation in this amplitude is corrected by the fact that the threads 3 are placed with a constant length on the support 9, a sliding of the threads 3 on the support 9 then takes place before the passage between the rollers 120, 121 of the calender 12, which automatically corrects this variation, the threads 3 being then in all cases deposited precisely with the given ratio $\tau$ and independently of the thread guide 7 by the ratio of the linear speeds $V_1$ and $V_2$, as previously indicated;

as a result of the lack of control of the tension between the capstan 5 and the calender 12, the ply 13 can be produced with great speed, for instance on the order of 10 meters a minute, which speed may reach, or even exceed, 20 meters a minute; in fact, a control of the tension employs devices which enter into vibration upon the passage of the threads, which considerably limits the speed of this passage.

By way of example, the details of the development are as follows:

support 9: polyethylene sheet on which a layer of rubber is applied, the width of the support 9 being 100 mm; the threads 3 are nylon twists the diameter of which is about 1.2 mm, the number of reels 2 being equal to 40 (one thread 3 per reel 2);

the linear speed $V_1$ is equal to 13 meters per minute and the linear speed $V_2$ is equal to 10 meters per minute, the ratio $\tau$ being therefore equal to 1.3;

the undulation length "1" of each of the threads 3 on the ply is equal to 15 mm and the density of the ply in threads 3 is 40 threads/dm, this density being measured perpendicular to the longitudinal direction of the plies, that is to say perpendicular to the arrow $V_2$;

the tension imparted by the means 4 is 2N/thread and the tension imparted by the means 11 and 14 is 10N for the assembly of the support 9 or ply 13, the tension being therefore the same for the support 9 and for the ply 13.

It goes without saying that these values are by no means limitative; thus, for instance, the number of reels 2 could be increased in order to reach or even exceed 60, and the width of the ply could reach or even exceed 60 cm.

The invention also applies in the event that only one thread 3 is used.

The value of $\tau$ may vary within wide limits, for instance from 1.01 to 3.

Likewise, the undulation length "1" of the threads 3 may vary within wide limits, for instance from 5 to 50 mm.

The density of the ply 13 in threads 3 may vary within wide limits, for instance, from 1 thread/dm to 60 threads/dm.

The invention is not limited to the means previously described; thus, for example, the capstan 5 could be replaced by two belts between which the threads 3 pass, and the comb 6 could be replaced by a thread guide having as many holes as there are threads 3.

Figure 5:
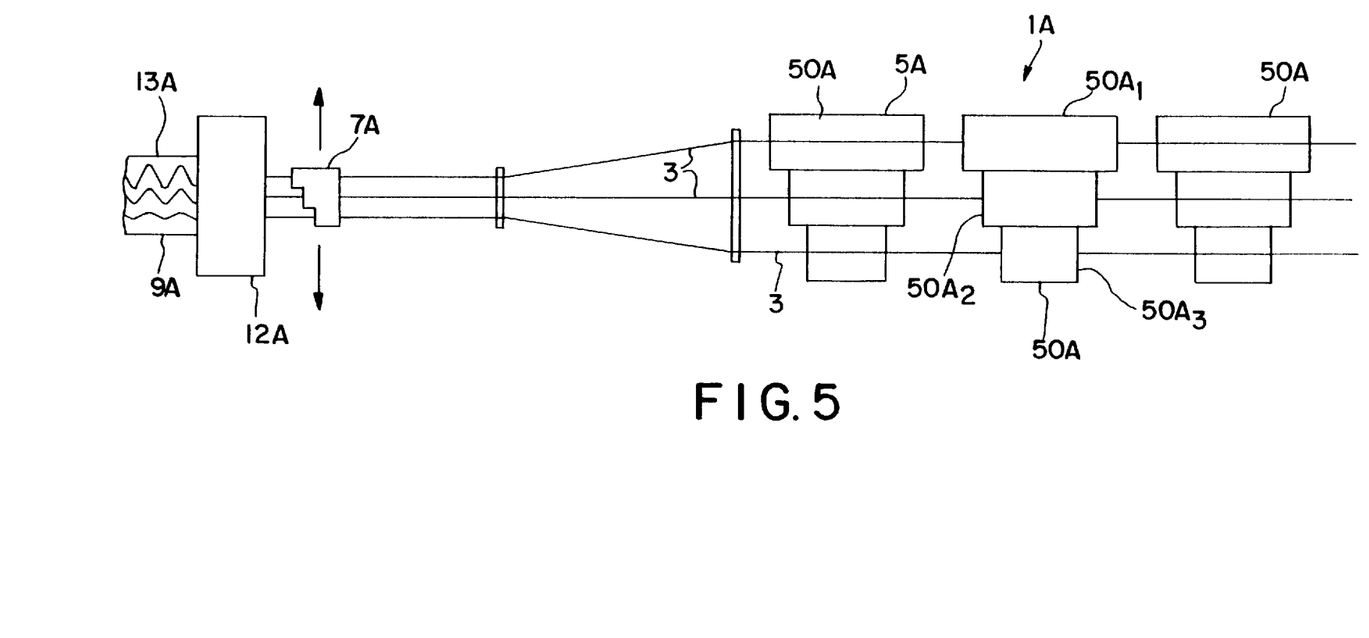
FIG. 5 shows, in top view, a portion of another device in accordance with the invention.

In the example previously described, the threads 3 all had the same speed upon emergence from the capstan 5, but the invention applies, for instance, also to cases in which the threads 3 have different speeds upon emergence from the means 5, as shown in FIG. 5. In the device 1A, which is shown in part, seen from above, in this FIG. 5, the means 5A are formed by a capstan comprising three series of cylinders 50A. Each of these series is formed of three cylinders $50A_1$, $50A_2$, $50A_3$ having the same axis and different diameters, over each of which a thread 3 passes. The three cylinders $50A_1$, $50A_2$, $50A_3$, of the same series 50A, turn at the same angular speed, and therefore the linear speed of the three threads 3 varies from one thread to the other, decreasing for instance from the cylinder $50A_1$ to the cylinder $50A_3$, so that the ratio T varies from one thread to the other on the ply 13A, increasing from the one side of the ply to the other, as shown in FIG. 5. In order to avoid excessive slipping of the threads 3 on the support 9A, it is therefore preferable that, for each thread, the distance between the calender 12A and the means 7A, which are imparted alternating movements, be greater the smaller the linear distance of the thread upon the entrance into these means. Thus, for instance, when these means 7A are formed of a thread guide, the length of the holes through which the threads pass varies in the manner previously described (the holes corresponding to the threads imparted the greatest speed being the longest, the entrance to all these holes into which the threads penetrate being situated at the same distance from the calender 12A).

Figure 6:
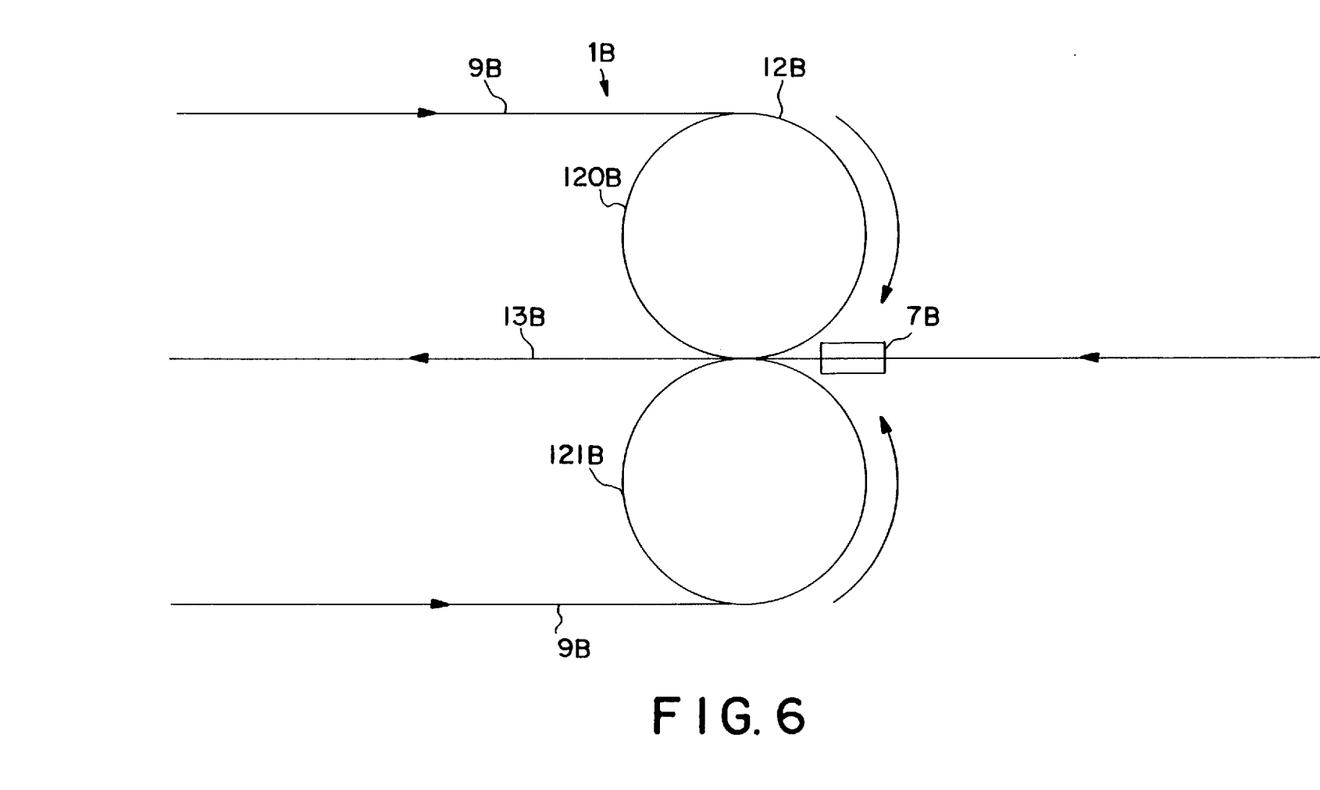
FIG. 6 shows, seen in profile, a portion of another device in accordance with the invention.

The invention applies to cases in which several supports are used in order to produce a ply, as shown in FIG. 6. In this figure there is shown, in vertical section, a portion of a device 1B with a calender 12B having two rollers 120B, 121B onto which there arrive two supports 9B, for instance identical to the support 9 previously described for the device 1. The threads 3 pass through the means 7B which are imparted alternating movements, for instance identical to the means 7 previously described, and they are sandwiched between the supports 9B when they assume their sinuous shape in order to produce the ply 13B comprising threads 3 arranged between the two supports 9B.

The plies of the invention can be used, for instance, to reinforce tires, for example by applying them above crown reinforcement plies of these tires or between the carcass plies of these tires when there are several carcass plies, particularly in the case of conventional tires. Upon the shaping and/or curing, the threads of these plies lose their sinuous shape and are oriented in the circumferential direction of these tires, that is to say substantially in planes perpendicular to the axis of rotation of the tires, so as to hoop these reinforcement plies in order, for instance, to withstand centrifugal forces, in particular in the case of aircraft tires.

One can also contemplate cases in which plies in accordance with the invention retain all or part of the undulations of the threads 3 after shaping and curing of the tires which contain these plies.

Of course, the invention is not limited to the embodiments described above.

I claim:

1. A process for applying at least one thread onto at least one support so as to obtain at least one ply, while imparting to the thread a sinuous shape comprising:

a) feeding the thread by driving means with a controlled linear speed of value $V_1$;

b) displacing the thread transversely to the direction of advance by thread displacing means;

c) applying the thread onto the support by driving calender means devoid of any mechanical retaining or guiding means for imparting to the thread the sinuous shape, said support being driven by said calender means which are separated from the means for displacing the thread transversely by a span and feeding the thread unsupported across the span, said calender means comprising rotatable drums having smooth outer surfaces, the thread being imparted the sinuous shape directly on the support by the means for displacing it transversely, the thread and the support thus in contact being driven in such a manner that the linear speed of the support has a value $V_2$ which is less than $V_1$, the thread being delivered with a controlled linear speed without then controlling the tension of the thread before applying it onto the support;

d) the conformation ratio L/1 of the thread thus applied onto the support being defined by the ratio $V_1/_2$ where L is the actual length of one undulation of the thread and 1 is the rectilinear length of one undulation.

2. A process according to claim 1, in which the tension of the thread is controlled upstream of the thread driving means.

3. A process as set forth in claim 1 in which the calender drums define between them a nip for advancing the support and threads and including feeding the threads unsupported between the transversely displacing means and the nip.

4. A device for applying at least one thread onto at least one support to obtain at least one ply, imparting to the thread a sinuous shape, this device comprising:

a) driving means for delivering the thread with a controlled linear speed of value $V_1$;

b) means for displacing the thread transversely to its direction of advance;

c) driving calendar means for driving the support and applying the thread onto the support, said calendar means being devoid of any mechanical retaining or guiding means for imparting to the thread the sinuous shape and being separated by a span from the means for displacing the thread transversely, the thread being unsupported as it is fed across the span between the means for displacing the thread transversely and the driving calendar means, and said driving calendar means comprising drums having smooth outer surfaces, the thread being imparted the sinuous shape directly on the support by the means displacing it transversely, the driving calender means driving the support with the thread thus in contact with the support so that the linear speed of the support has a value $V_2$ which is less than $V_1$; the device being without means for controlling the tension of the thread between the driving means for delivering the thread and the driving calendar means;

d) the conformation ratio L/1 of the thread thus applied onto the support is thus defined by the ratio $V_1/V_2$ where L is the actual length of one undulation of the thread and 1 is the rectilinear length of one undulation.

5. A device according to claim 4, which includes means for controlling the tension of the thread upstream of the driving means for delivering the thread.

6. A device according to claim 4, in which the means for delivering the thread include a capstan.

7. A device according to claim 4, in which the means for transversely displacing the thread include a thread guide.

8. A device according to claim 4, including means for assembling a plurality of threads upstream of the means for transversely displacing the threads.

9. A device according to claim 8, in which the means for assembling the threads include a thread guide.

10. A device as set forth in claim 4 in which the calender drums define between them a nip for advancing the support and threads and the threads are fed unsupported between the transversely displacing means and the nip.

* * * * *

UNITED STATES PATENT AND TRADEMARK OFFICE
CERTIFICATE OF CORRECTION

PATENT NO. : 5,863,368

DATED : January 26, 1999

INVENTOR(S) : Frédéric Perrin

It is certified that error appears in the above-identified patent and that said Letters Patent is hereby corrected as shown below:

Col. 8, line 5: "$V_{1/2}$" should read --$V_1/V_2$--;

Col. 8, line 7: "1" should read --l-- (non-bolded lower case letter L);

Col. 6, line 43: "1" should read --l-- (non-bolded lower case letter L).

Signed and Sealed this

Seventeenth Day of October, 2000

Attest:

Q. TODD DICKINSON

*Attesting Officer*          *Director of Patents and Trademarks*